United States Patent [19]

Bakewell, Jr. et al.

[11] 4,236,401
[45] Dec. 2, 1980

[54] FREQUENCY RESPONSE TESTER

[75] Inventors: Henry P. Bakewell, Jr., Old Saybrook; Marguerite A. Johnson, Mystic, both of Conn.

[73] Assignee: United States of America as represented by the Secretary of the Navy, Washington, D.C.

[21] Appl. No.: 42,173

[22] Filed: May 24, 1979

[51] Int. Cl.³ .................. G01L 25/00; H04R 29/00
[52] U.S. Cl. .................................. 73/1 DV; 367/13
[58] Field of Search .............. 73/1 DV, 1 B, 584; 367/13

[56] References Cited

U.S. PATENT DOCUMENTS

| | | | |
|---|---|---|---|
| 3,759,082 | 9/1973 | Provenzano et al. | 73/1 B |
| 3,830,091 | 8/1974 | Sinsky | 73/1 DV |
| 3,864,664 | 2/1975 | Trott et al. | 73/1 DV |
| 4,090,169 | 5/1978 | Adair et al. | 73/1 DV |

Primary Examiner—Stephen A. Kreitman
Attorney, Agent, or Firm—Richard S. Sciascia; Arthur A. McGill; Prithvi C. Lall

[57] ABSTRACT

Apparatus and method for determining the frequency response of an acoustic sensor of a line array embedded in an elastic material to a momentary force applied to the elastic material at any point thereof. The apparatus includes a longitudinal box which has its bottom and two opposite side ends open. The device includes a slider movable at the top of the box which has an attached pivoted arm at the top. The pivoted arm has a force gauge secured thereto. The box is placed over the line array under test and the arm is pivoted to strike the surface of the line array. The force gauge attached to the pivoted arm measures the applied force while the electrical signals generated by the line array are used to find the frequency response of the acoustic sensor of the line array.

7 Claims, 2 Drawing Figures

FREQUENCY RESPONSE TESTER

STATEMENT OF GOVERNMENT INTEREST

The invention described herein may be manufactured and used by or for the government of the United States of America for governmental purposes without the payment of royalties thereon or therefor.

BACKGROUND OF THE INVENTION

The present invention generally relates to systems for evaluating the frequency response of sensors of an acoustic line array and particularly to an apparatus for providing an impulsive force to be applied at any point of the elastic material of the acoustic array under test to evaluate its frequency response.

In the past, some success has been achieved in determining the step voltage response of an acoustic sensor embedded in an elastic material due to the impact of a known force at a point on the surface of the elastic material of an acoustic array. This technique has been used primarily to evaluate the effective surface area of the elastic material over which the embedded acoustic sensor responds. However, the technique is not readily adaptable to application to acoustic sensors embedded in long cylindrical line arrays. Furthermore, the technique does not permit a direct measure in frequency of the transfer function between the point surface excitation and the response of the acoustic sensor within the array. Thus it is desirable to have a simple means of experimentally determining the frequency response of the acoustic sensor embedded in an elastic material to an impulsive force supplied at any point on the elastic material of an acoustic array.

SUMMARY OF THE INVENTION

An apparatus and method for determining the frequency response of an acoustic sensor of a line array embedded in an elastic material according to the teachings of subject invention includes a longitudinal box having its bottom and two opposite side ends open and having a movable slider attached to a pivoted arm slidable at the top of the box. The pivoted arm has a force gauge secured thereto with a pointed conical tip attached to the force gauge. The box is placed over the line array portion of the line array under test and the arm is pivoted such that the conical tip attached to the force gauge strikes the surface of the line array. The force gauge attached to the arm measures the applied force while the electrical signals generated by the acoustic sensor are used to find the frequency response thereof.

An object of the subject invention is to provide a simple means of experimentally determining the frequency response of an acoustic sensor embedded in an elastic material to an impulsive force applied at any point of the elastic material.

Another object of subject invention is to have a device to be used for experimental determination of the transfer function as a function of frequency between a measured force which need not be a true impulse applied on the surface of line array of acoustic sensors and the output of any of the sensors contained within the line array filled with either an elastic material or a liquid.

Still another object of subject invention is to provide an apparatus and method which supplies a direct measure in frequency of the transfer function between the points of the excitation as a function of the spatial location of the excitation relative to the sensor and the response of the acoustic sensor within the line array.

Other objects, advantages and novel features of the invention will become apparent from the following detailed description of the drawings when considered in conjunction with the accompanying drawings wherein:

DESCRIPTION OF A PREFERRED EMBODIMENT

Figure 1:
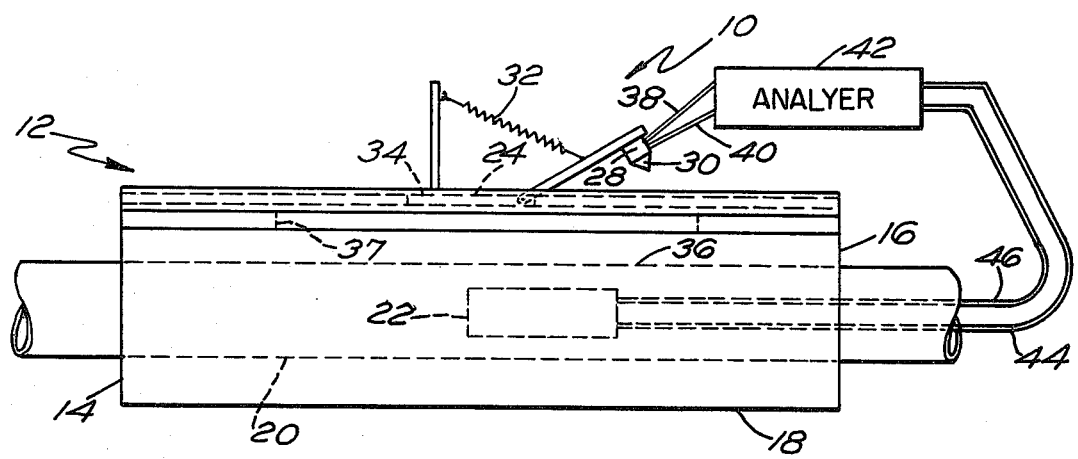
FIG. 1 is a schematic representation of the apparatus of the device built according to the teachings of subject invention.

Referring to the drawings, FIG. 1 shows schematically a system 10 for determining the frequency response of an acoustic sensor of a line array embedded in an elastic material. It comprises a box-like structure 12 open on both ends 14 and 16 and on bottom 18. The box 12 is placed over the portion of the line array 20 to be tested with a movable slider 24 and attached arm 26 at the end of which is located a force gauge 28 having an attached conical end 30. A spring 32 between the pivoted arm 26 and a portion 34 of the slider 24 maintains the pivoted arm 26 with attached force gauge 28 in a position off the array 14 except during the moment of manual depression of the pivoted arm 26 which produces momentary contact of conical point 30 with the array surface 36. Leads 38 and 40 from force gauge are connected to an analyzer 42 which has transducer leads 44 and 46 also connected thereto. The voltage signal generated by the force gauge 28 measures the response of the force gauge as a function of frequency whereas the voltage signal generated by the transducer measures of the response of the transducer to the applied momentary force as a function of frequency.

Figure 2:
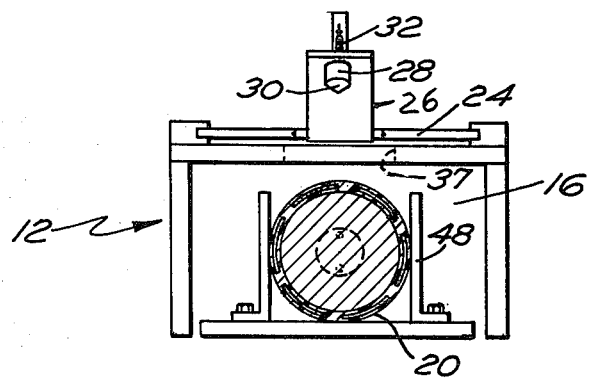
FIG. 2 is a cross-sectional view of FIG. 1.

During the operation, the momentary contact of conical point 30 through slot 37 in the top of box 12 with the array surface 36 causes an electrical signal to be generated by the force gauge 28 and by the acoustic sensor 22 of the array which is within the line array 14. Lead wires 44 and 46 from sensor 22 are connected to the analyzing equipment 42 for subsequent processing so as to yield the frequency transfer function between the measured electrical signals. By means of slider 24, the position of contact between the conical point 30 and the surface of the array may be varied along the array axis. Measurement of the transfer function along the axial line located at different positions on the array circumference is accomplished by rotation of the line array 20 which may be positioned in channel 48 of FIG. 2. The above described procedure is now carried out on the rotated array. In practice, a sensing device such as a photocell or the like may be included on slider 24 such that the pressure of pivoted arm 26 provides an additional electrical signal at a preset time before the impact of conical point 30 with a portion of array 20. This signal is then used to trigger the analyzing equipment 42 in use.

Briefly stated, the frequency response tester is a device for applying a measured force at any selected point on the surface of a cylindrical line array whereby the electrical signal representing the surface force input may subsequently be combined in a standard analyzing equipment to yield the array transfer function between the surface excitation and an internal sensor output. The device essentially includes a box-like structure open on both ends and the bottom thereof which is placed over a portion of a line array under test. A movable slider is moved over the box-like structure and a pivoted arm is attached thereto. The pivoted arm has a force gauge attached at the free end which has a conical pointed end. A spring between the pivoted arm and a portion of the slider maintains the arm with attached force gauge away from the array except during the momentary contact on manual depression of the pivoted arm. This produces a momentary contact of the conical point with the array surface and generates electrical signal which is analyzed by a standard analyzing equipment.

Obviously many modifications and variations of the present invention may become apparent in the light of above teachings. As an example, pivoted arm can be replaced with any other mechanical assembly such as a spring loaded assembly on guide pins to which the force gauge and means for cutting the light beam are attached. Furthermore, the device can be used with any type of cylindrical towed line array instead of the one used for elastic filled line array having acoustic sensors embedded therein. Furthermore, changes in the above described box-like structure that supports the pivoted arm assembly can be easily made to adapt the device for use in testing acoustic sensors embedded in the planar array configurations. It is therefore understood that within the scope of the appended claims the invention may be practiced otherwise than as specifically described.

We claim:

1. An apparatus for determining the frequency response of an acoustic sensor of an acoustic line array comprising:
    a generally elongated box having two opposite ends and the bottom thereof open and the top thereof having a longitudingal slot, said elongated box further adapted to enclose a portion of the acoustic line array including the acoustic sensor under test;
    a slider means for applying a measured force upon the acoustic sensor of said acoustic line array, said slider means being slidable over the top of said elongated box; and
    analyzer means for measuring the response of said acoustic sensor to the measured force as a function of frequency.

2. The apparatus of claim 1 wherein said slider includes a longitudinal arm slidable over the top of said box and a rotatable arm pivoted at an end of the longitudinal arm; the opposite end of the rotatable arm having a force gauge attached thereto.

3. The apparatus of claim 2 wherein the rotatable arm of said slider means is adjustably secured to a generally vertical arm using a spring.

4. The apparatus of claim 3 wherein said force gauge includes a tip for striking said acoustic sensor to generate a signal in response to the measured force.

5. The apparatus of claim 4 wherein said analyzer is adapted to be connected said force gauge and to said acoustic sensor to measure responses thereof as a function of frequency.

6. The apparatus of claim 5 wherein said acoustic line array is fixedly positioned in a channel.

7. A method for measuring the frequency response of an acoustic sensor of a line array using a slider adapted to slide over a longitudinal box top and adjustable to strike said acoustic sensor with a measurable force which includes the steps of:
    securing a portion of said line array having said acoustic sensor in a channel;
    striking said acoustic sensor with a force measurable by said pressure gauge; and
    measuring a signal generated by said acoustic sensor in response to the measured force.

* * * * *